United States Patent [19]

Kobayashi et al.

[11] Patent Number: 4,679,899
[45] Date of Patent: Jul. 14, 1987

[54] OPTICAL FIBER

[75] Inventors: Toshiaki Kobayashi; Kazuo Sanada; Toshiaki Murayama, all of Chiba; Yasuyuki Sugawara, Sakura; Naoshi Uesugi, Mito, all of Japan

[73] Assignees: Fujikura Ltd.; Nippon Telegraph & Telephone Public Corporation, both of Tokyo, Japan

[21] Appl. No.: 706,574

[22] Filed: Feb. 28, 1985

[30] Foreign Application Priority Data

Mar. 1, 1984 [JP] Japan ............................ 59-39184

[51] Int. Cl.$^4$ ................................. G02B 6/10
[52] U.S. Cl. ............................ 350/96.30; 350/96.34
[58] Field of Search ............... 350/96.29, 96.30, 96.34; 427/163; 350/96.23

[56] References Cited

U.S. PATENT DOCUMENTS 3,508,950  4/1970  Marzocchi .................. 350/96.34

Primary Examiner—Robert E. Wise
Attorney, Agent, or Firm—Sprung Horn Kramer & Woods

[57] ABSTRACT

An optical fiber of a silica-based material includes a coating of cured silicone rubber covering an outer surface thereof. The cured silicone rubber coating, when subjected to an infrared spectroscopic measurement, has a transmissivity of not less than 70% at a wave number of 2100 to 2200 cm$^{-1}$ at a coating thickness of 0.1 mm due to the infrared absorption due to the stretching and vibration of SiH. The coating of cured silicone rubber contains a neglibible amount of SiH so that the transmission loss of the optical fiber can be prevented from increasing over a long period of time.

6 Claims, 5 Drawing Figures

OPTICAL FIBER

BACKGROUND OF THE INVENTION

Field of the Invention

This invention relates to optical fibers for an optical fiber cable for use as transmission lines in communication systems and particularly to such optical fibers of which transmission loss is not increased over a prolonged period of time.

It has been recognized that the loss of optical fibers is increased in the range of long wavelengths a long period of time, for example, 5 to 10 years, after an optical fiber cable is installed. It is thought that this phenomenon arises from the fact that a small amount of hydrogen gas ($H_2$), generated from cured silicone rubber constituting the coating on the optical fiber, is turned to hydroxyl radical (OH) over a long period of time which hydroxyl radical causes the loss of the optical fiber to increase in the range of not less than 1.4 um wavelength.

It has been found that the small amount of hydrogen gas is generated from non-crosslinked Si-H contained in the curing agent contained in the cured silicone rubber. Therefore, it has been found that the reduction or elimination of the residual Si-H in the cured silicone rubber prevents the increase of the loss of the optical fiber.

SUMMARY OF THE INVENTION

It is therefore an object of this invention to provide an optical fiber for an optical fiber transmission cable of which transmission loss is not increased even a long period of time after the optical cable is installed.

According to the present invention, there is provided an optical fiber of a silica-based material having a coating of cured silicone rubber covering an outer surface thereof, the cured silicone rubber coating. when subjected to an infrared spectroscopic measurement, having a transmissivity of not less than 70% at a wave number of 2100 to 2200 cm$^{-1}$ at a coating thickness of 0.1 mm due to the infrared absorption due to the stretching and vibration of SiH.

The coating of cured silicone rubber is applied directly to the outer surface of the optical fiber to serve as a primary coating. Alternatively, one or more coatings made, for example, of urethane or epoxy resin are interposed between the outer surface of the optical fiber and the silicone rubber coating.

The optical fiber is prepared by a process comprising the steps of applying thermosetting silicone rubber to the optical fiber to form a coating; and curing the thermosetting coating in an atmosphere containing not more than 10% by volume of oxygen at a curing temperature higher than the temperature at which the thermosetting coating begins to be burnt in the air containing 20% by volume of oxygen.

DESCRIPTION OF THE INVENTION

An optical fiber according to the present invention has a coating composed of cured silicone rubber which, when subjected to an infrared spectroscopic measurement, has a transmissivity of not less than 70% at a wave number of 2100 to 2200 cm$^{-1}$ at a coating thickness of 0.1 mm due to the infrared absorption due to the stretching and vibration of SiH.

Generally, the peak of the infrared absorption due to the stretching and vibration of SiH is at a wave number of 2000 to 3000 cm$^{-1}$, but the cured silicone rubber coating of the optical fiber coating under consideration has the infrared absorption peak at a wave number of 2100 to 2200 cm$^{-1}$ due to non-crosslinked SiH remaining in the coating. Therefore, it will suffice that the absorption peak at this wave number range is considered. The above transmissivity is determined at a coating thickness (the length of path of light) of 0.1 mm at the atmosphere. When the transmissivity is less than 70%, the amount of the residual SiH in the cured silicone rubber is too large, so that the increase of the transmission loss can not be efficiently prevented.

According to the present invention, the residual SiH content of the cured silicone rubber is less than the above specific value determined by the infrared spectroscopic measurement. Therefore, the amount of SiH in the cured silicone rubber is small, and hence hydrogen gas ($H_2$) generating from SiH is correspondingly reduced, so that the increase of OH in the optical fiber is prevented, thereby efficiently preventing the loss of the optical fiber from increasing. Therefore, the optical fiber having the coating made of the cured silicone rubber of the above construction can maintain a good transmission ability over a prolonged period of time.

EXPERIMENT

Figure 1:
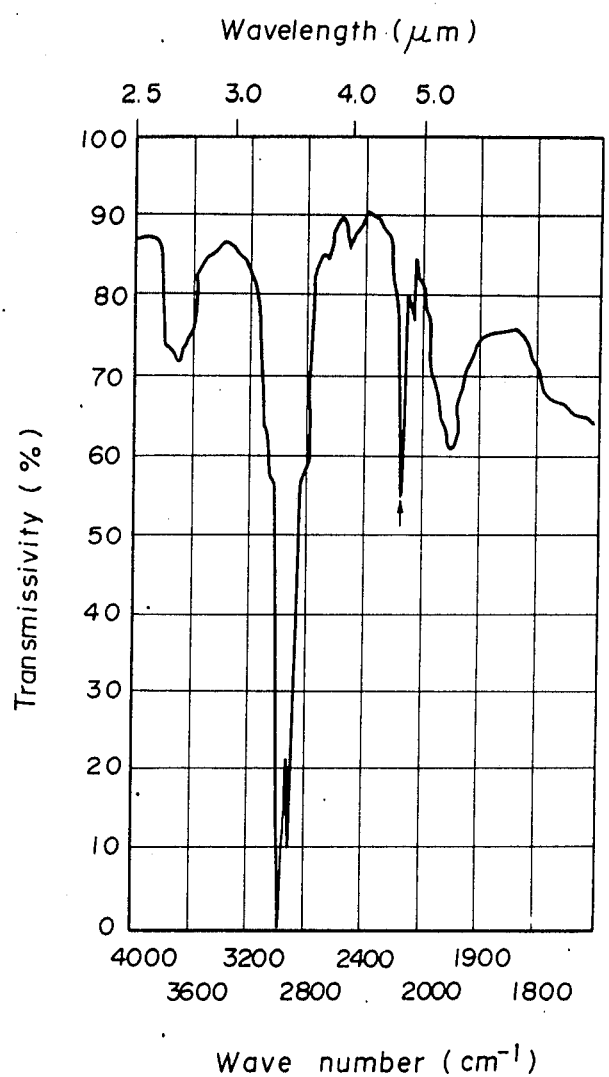
FIGS. 1 to 3 are diagrammatical illustrations showing infrared absorption spectra of cured silicone rubber coatings having different SiH contents.
Figure 2:
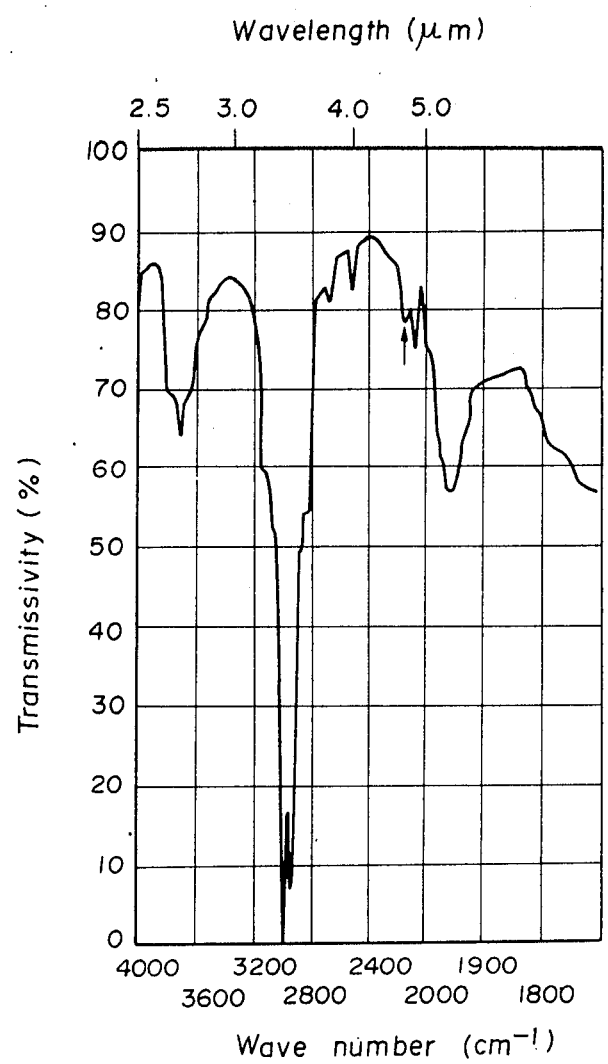
Figure 3:
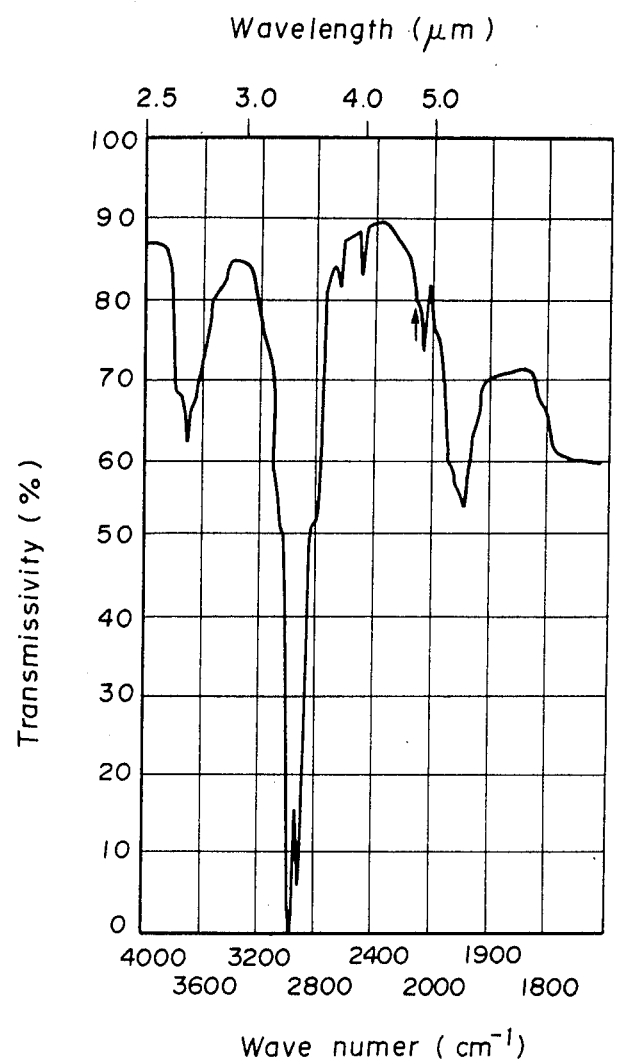

The residual non-crosslinked SiH content of cured silicone rubber can be determined by spectrophotometry. An infrared absorption spectrum shown in FIG. 1 is one of a first coating sample of cured silicone rubber having a relatively large amount of SiH, and an abrupt absorption peak at a wave number of 2150 cm$^{-1}$ is due to the stretching and vibration of SiH. The concentration of the residual SiH in the cured silicone rubber can be determined by the value of this peak. The first sample coating was formed by the steps of applying 0.1 mm thick film of thermosetting silicone rubber on a glass plate and then curing the film to provide the sample coating under the same conditions used for the production of the coating of the optical fiber. FIGS. 2 and 3 show spectra of second and third sample coatings, respectively, which were formed according to the above procedure except that the curing conditions were different so as to change the amount of residual SiH in the respective cured samples. In the spectrum shown in FIG. 2, the transmissivity at a wave number of 2150 cm$^{-1}$ is about 78%, and the amount of SiH is substantially reduced in comparison with that shown in FIG. 1. In the spectrum shown in FIG. 3, the transmissivity at a wave number of 2150 cm$^{-1}$ is about 82% which is approximately equal to that of the background of the spectrum of FIG. 3, and therefore it is considered that the amount of the residual SiH is negligible.

A thermosetting silicone rubber was applied to four optical fibers of the same construction, prepared by a CVD method, to form 0.1 mm thick coating on each of the optical fibers. Then, the coatings of the four optical fibers were cured under different curing conditions in such a manner that the transmissivities of the cured coatings at a wave number of 2150 cm$^{-1}$ were 82%, 78%, 70% and 55%, respectively. Then, a nylon jacket was applied to each optical fiber. According to the same procedure, another four silicone rubber-coated optical fibers were prepared except that the optical fibers were produced by a VAD method.

Figure 4:
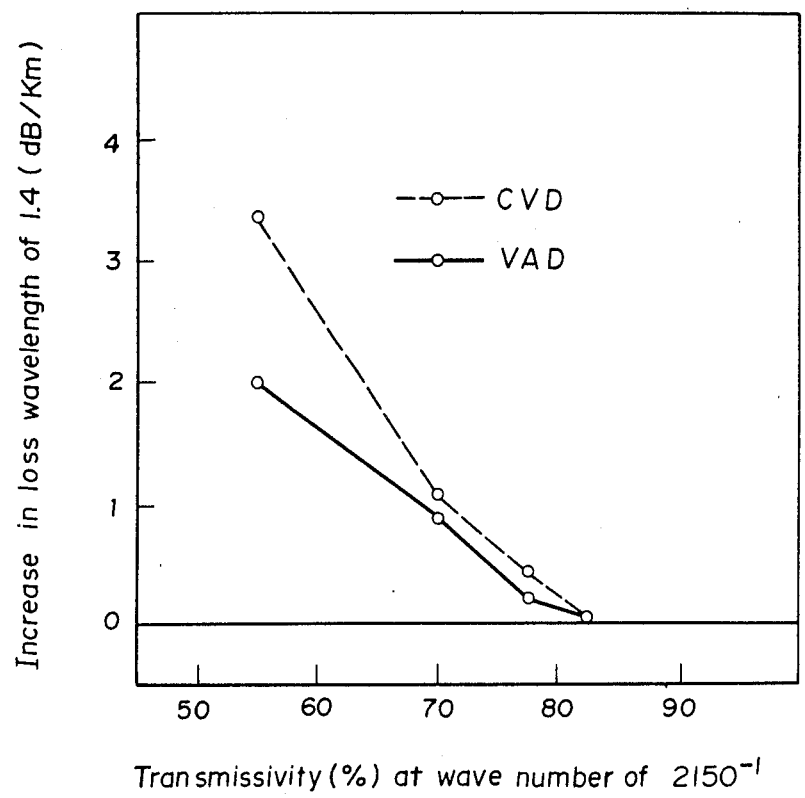
FIG. 4 is a diagrammatical illustration showing a relation between the amount of increase of transmission loss at a wavelength of 1.4 um and transmissivities of coatings of nylon-jacketed optical fibers at a wave number of 2150 cm$^{-1}$.

Transmission characteristics of the above nylon-jacketed optical fibers were measured soon after they were prepared. Then, the optical fibers were subjected to an accelerated deterioration test in which the optical fibers were heated at a temperature of 200° C. for 6 hours. Then, the transmission characteristics of the nylon-jacketed optical fibers were again measured. FIG. 4 shows the relation between the amount of increase of transmission loss at a wavelength of 1.4 μm and the transmissivities of the coatings. As can be seen from FIG. 4, when the transmissivity is not less than 80%, the transmission loss is not substantially increased. Also, when the transmissivity is not less than 70%, the increase of the loss can be kept to about 1 dB/Km. When the transmissivity is less than 70%, particularly the optical fibers prepared by a CVD method are abruptly increased in loss. This is undesirable.

It has been confirmed that the deterioration imparted to the optical fibers by the above accelerated deterioration test corresponds to the deterioration to which the optical fiber is subjected upon lapse of 5 to 7 years in practical use. Therefore, it is considered that the optical fiber having the coating of the cured silicone rubber having a transmissivity of about 80% is not increased in loss even after it is used for about 5 years.

Figure 5:
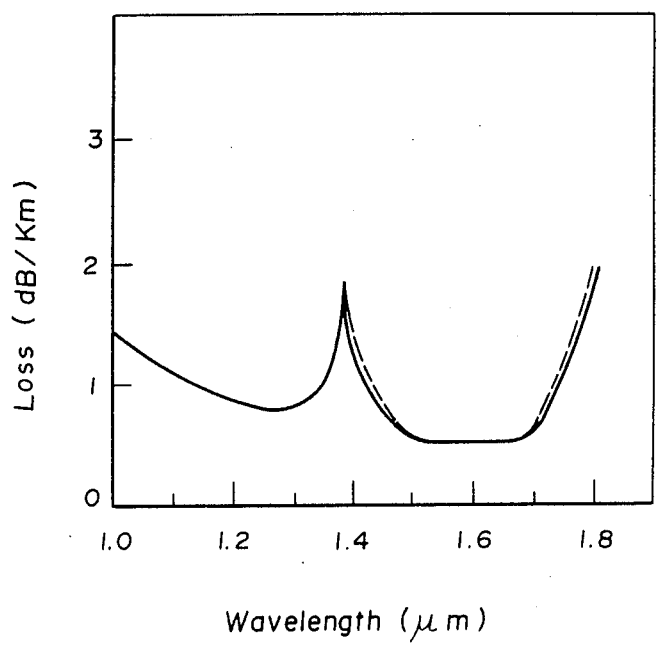
FIG. 5 is a diagrammatical illustration showing a change in transmission characteristics of a nylon-jacketed optical fiber having a coating having a transmissivity of 82% when the optical fiber is subjected to an accelerated deterioration test.

An optical fiber prepared by a CVD method and having a 0.1 mm thick coating of cured silicone rubber having a transmissivity of 82% was prepared. Then, a nylon jacket was applied to the optical fiber. Then, the nylon-jacketed optical fiber was subjected to an accelerated deterioration test in which the optical fiber was heated at 200° C. for 6 hours. FIG. 5 shows a change in transmission characteristics of the nylon-jacketed optical fiber subjected to the deterioration test. In FIG. 5, a solid line indicates the transmission characteristics of the optical fiber before the deterioration test, and a broken line indicates the transmission characteristics after the deterioration test. As can be seen from FIG. 5, the transmission loss is not appreciably increased in the range of the wavelength of 1.0 to 1.8 μm.

The above test results indicate that the coating of cured silicone rubber which, when subjected to an infrared spectroscopic measurement, has a transmissivity of not less than 70% at a wave number of 2100 to 2200 cm$^{-1}$ at a coating thickness of 0.1 mm, has a negligible content of the residual SiH, so that hydrogen gas (H$_2$) is not generated, thereby ensuring that the optical fiber with such a coating is not increased in transmission loss for a prolonged period of time.

A process of manufacturing an optical fiber having a coating of cured silicone rubber having a negligible content of the residual SiH will now be described.

An optical fiber is coated with a thermosetting silicone rubber. Then, the optical fiber with the uncured coating is passed through a curing oven at a predetermined temperature at a predetermined feed rate, so that the thermosetting coating is cured to provide the optical fiber having the coating of the cured silicone rubber.

In order that the SiH content of the cured silicone rubber can be reduced as much as possible, the silicone rubber is cured sufficiently to crosslink the curing agent at a rate of 100%. To achieve this, it is necessary to increase the time of the crosslinking treatment and to elevate the crosslinking temperature. However, the increase of the crosslinking time lowers the production rate, and requires that a curing oven having an increased length should be provided, which increases the installation cost.

Therefore, instead of increasing the crosslinking time, it is considered appropriate to elevate the crosslinking temperature. However, when the silicone rubber is cured at such elevated temperatures that the cured silicone rubber contains no SiH, the silicone rubber is subjected to burning. Thus, an undue elevation of the curing temperature is not practical.

For example, conventionally, when the silicone rubber coating is cured at a feed rate of 60 m/min. by the use of a curing oven having an effective length of 60 cm, the crosslinking temperature is 700 to 800° C. With this curing treatment, however, the SiH content of the cured coating is not negligible. With the same effective oven length and feed rate, it is necessary to elevate the crosslinking temperature to 900 to 1,000° C. However, the silicone rubber is subjected to burning at such elevated temperatures. According to the present invention, to avoid this, gas containing no oxygen, such as N$_2$, is introduced into the curing oven to keep the O$_2$ content of the gas in the oven to not more than 10% in order to prevent the burning of the silicone rubber coating. Helium gas can be advantageously added to the atmosphere in the curing oven to enhance the heating of the coating due to a high thermal conductivity of the helium gas.

The thermosetting silicone rubber coating is cured in the curing oven at one time at sufficiently high temperatures to completely crosslink the silicone rubber. Alternatively, the thermosetting coating is first cured to a certain degree at lower temperatures in the curing oven. Then, the coating cured to such a degree is again cured at temperatures higher enough to completely crosslink the silicone rubber coating.

Instead of increasing the curing temperature, a curing accelerator (catalyst), such as a salt of metal such as tin and zinc or organic amines, may be added to the curing agent to achieve a complete crosslinking of the silicone rubber coating.

EXAMPLES

A silica-based optical fiber having a diameter of 150 um was prepared by drawing. Then, immediately, the optical fiber was coated with a thermosetting silicone rubber in the form of a liquid. Then, the optical fiber with the thermosetting coating was introduced into a curing oven in which the coating was cured to provide a 0.1 mm thick coating of the optical fiber. In this manner, optical fibers A to C each having the coating were prepared at different curing conditions as shown below. The SiH content of the cured silicone rubber coating of each optical fiber was determined in terms of a transmissivity at a wave number of 2100 cm$^{-1}$ through an infrared spectroscopic measurement.

(a) Optical fiber A

Effective length of curing oven: 60 cm

Feed rate: 60 m/min.
Atmosphere in the oven: air containing 20% by volume of oxygen
Curing temperature: 700° to 800° C.
Transmissivity: 56%

(b) Optical fiber B

Effective length of curing oven: 60 cm
Feed rate: 60 m/min.
Atmosphere in the oven: mixture gas containing 10% by volume of oxygen and 90% by volume of nitrogen
Curing temperature: 900° to 1000° C.
Transmissivity: 78%

(c) Optical fiber C

Effective length of curing oven: 60 cm
Feed rate: 60 m/min.
Atmosphere in the oven: mixture gas containing 20% by volume of helium and 80% by volume of nitrogen
Curing temperature: 900° to 1000° C.
Transmissivity: 82%

Also, another optical fiber was prepared according to the above procedure except that a coating of thermosetting silicone rubber was cured in the curing oven at two stages at the following curing conditions. The SiH content of the cured silicone rubber coating was determined according to the above procedure.

(i) First stage curing

Effective length of curing oven: 60 cm
Feed rate: 60 m/min.
Atmosphere in the oven: air containing 20% by volume of oxygen
Curing temperature: 700° to 800° C.

(ii) Second stage curing

Effective length of curing oven: 60 cm
Feed rate: 80 m/min.
Atmosphere in the oven: mixture gas containing 10% by volume of oxygen and 90% by volume of nitrogen
Curing temperature: 900° to 1000° C.
The coating of the cured silicone rubber of this optical fiber had a transmissivity of 75%.

It will be appreciated from the foregoing that when the atmosphere in the curing oven contains not more than 10% by volume of oxygen, the thermosetting silicone rubber coating can be cured at the high temperatures of 900° to 1000° C. so that the SiH content of the resultant coating is kept to the predetermined low level.

What is claimed is:

1. An optical fiber of a silica-based material having a coating of cured silicone rubber covering an outer surface thereof, said cured silicone rubber coating, when subjected to an infrared spectroscopic measurement, having a transmissivity of not less than 70% at a wave number of 2100 to 2200 cm$^{-1}$ at a coating thickness of 0.1 mm due to the infrared absorption due to the stretching and vibration of SiH.

2. An optical fiber according to claim 1, produced by a process comprising the steps of:
   (a) applying thermosetting silicone rubber to said optical fiber to form a coating; and
   (b) curing said thermosetting coating in an atmosphere containing not more than 10% by volume of oxygen at a curing temperature higher than the temperature at which said thermosetting coating begins to be burnt in the air containing 20% by volume of oxygen.

3. An optical fiber produced by the process according to claim 2, in which said atmosphere further containing helium gas.

4. An optical fiber produced by the process according to claim 3, in which the step of curing said thermosetting coating is effected by heating said coating at a temperature lower than said curing temperature, and subsequently heating said coating at a temperature equal to said curing temperature.

5. An optical fiber produced by the process according to claim 2, in which the step of curing said thermosetting coating is effected by heating said coating at a temperature lower than said curing temperature, and subsequently heating said coating at a temperature equal to said curing temperature.

6. An optical fiber according to claim 1, in which at least one coating layer is interposed between the outer surface of the optical fiber and said coating of cured silicone rubber.

* * * * *

UNITED STATES PATENT AND TRADEMARK OFFICE
CERTIFICATE OF CORRECTION

PATENT NO. : 4,679,899

DATED : July 14, 1987

INVENTOR(S) : Toshiaki Kobayashi, et al.

It is certified that error appears in the above-identified patent and that said Letters Patent is hereby corrected as shown below:

Title Page, No. "[75] Inventors:", line 4  After "Mito", insert --Koushi Ishihara, Mito--

Signed and Sealed this

First Day of March, 1988

Attest:

DONALD J. QUIGG

Attesting Officer  Commissioner of Patents and Trademarks